J. E. ERB.
SCRAPING AND COVERING ATTACHMENT FOR GRAIN DRILLS, DISK HARROWS, AND THE LIKE.
APPLICATION FILED OCT. 3, 1912.

1,051,873. Patented Feb. 4, 1913.

Witnesses

Jacob E. Erb, Inventor
by C. A. Snow & Co., Attorneys

UNITED STATES PATENT OFFICE.

JACOB E. ERB, OF RYDER, NORTH DAKOTA.

SCRAPING AND COVERING ATTACHMENT FOR GRAIN-DRILLS, DISK HARROWS, AND THE LIKE.

1,051,873.  Specification of Letters Patent.  Patented Feb. 4, 1913.

Application filed October 3, 1912. Serial No. 723,805.

*To all whom it may concern:*

Be it known that I, JACOB E. ERB, a citizen of the United States, residing at Ryder, in the county of Ward and State of North Dakota, have invented a new and useful Scraping and Covering Attachment for Grain-Drills, Disk Harrows, and the Like, of which the following is a specification.

This invention relates to scraping and covering attachments for planters and the like and is more particularly designed as an improvement upon the structure disclosed in Patent No. 1,032,998, issued to me on July 16, 1912.

One of the objects of the invention is to provide a flexible scraper of the type disclosed in my patent above referred to, said scraper utilizing an arch whereby material collected by the side portions of the scraper will be free to escape through the arch and will thus cover any seed which may be deposited in the path of the arch.

A further object is to provide a device of this character having two or more surface engaging edges whereby the structure is rendered more efficient as a scraping means.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made without departing from the spirit of the invention.

In the accompanying drawings the preferred form of the invention has been shown.

Figure 1:
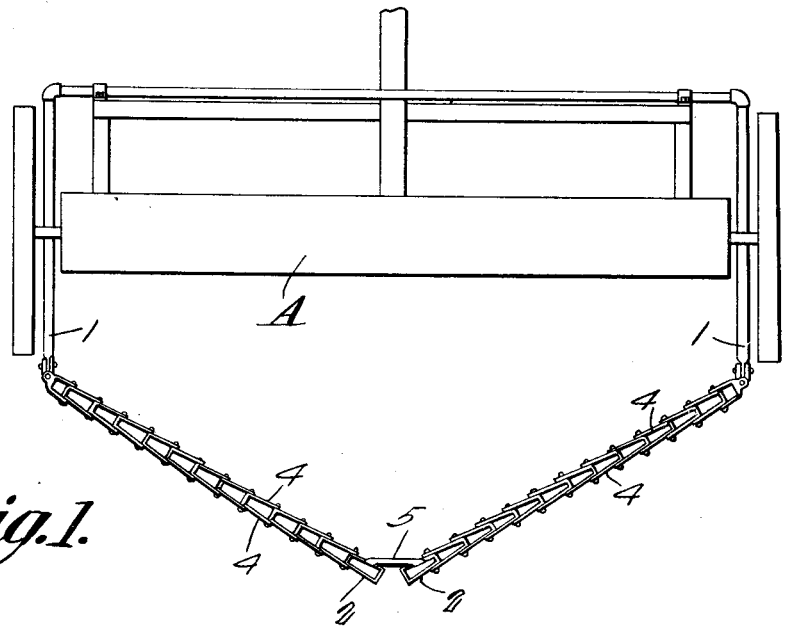
Figure 2:
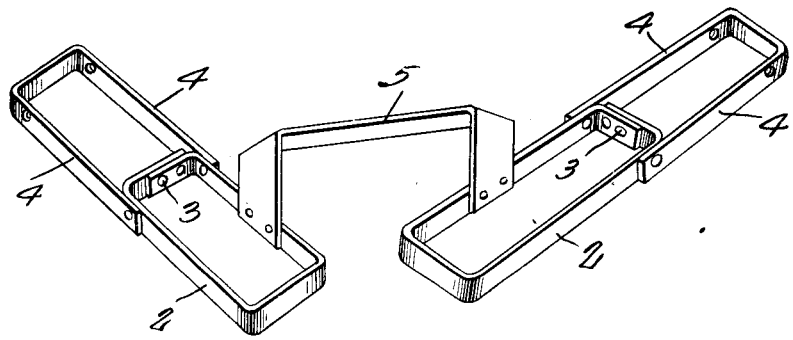

In said drawings:—Figure 1 is a plan view of the device attached to a planter, only a portion of the planter being shown. Fig. 2 is an enlarged perspective view of the middle portion of the attachment.

Referring to the figures by characters of reference A designates a portion of a planter and extending rearwardly therefrom are arms 1 to which the attachment is secured. In the form illustrated, this attachment is made up of substantially rectangular links pivotally connected in any suitable manner, so as to form separate chains which converge rearwardly. The rearmost link of each chain is preferably made of a single length of metal folded to form a substantially oblong link 2, the ends of the strip lapping and being riveted or otherwise fastened together as shown at 3. All the other links of each chain are made up of opposed U-shaped straps 4 lapped together at one end and are pivotally connected at their other end to the next adjoining link. The lapping portions of the strips 4 are riveted or otherwise pivotally secured together.

It will be apparent that by providing links such as described, the chains are free to flex in vertical planes but cannot flex horizontally. The rearmost links of the chain 2 are connected by a stiff metallic arch 5 upstanding therefrom. Furthermore these rear links are spaced apart.

It will be apparent that when the attachment is drawn forward, the chains will slide over the surface of the ground but will not flex in a horizontal plane. Instead they will unyieldingly engage the soil in the path thereof and scrape it forwardly and inwardly so that it will finally escape, in the form of a hill, through the space under the arch 5. As the chains are free to flex in vertical planes, they can yield, wherever necessary, to pass over an uneven surface.

It will be noted that the links present two longitudinal edges to the soil and the chains are thus more efficient as scraping means than where only a single edge is presented to the soil by each link.

The scraper herein described can be arranged back of a plurality of grain drills carried by one machine and also can be used back of a plurality of harrow disks.

What is claimed is:—

1. An attachment of the class described including rearwardly converging scraping elements each consisting of pivotally connected members adapted to flex in a vertical plane but incapable of flexing in a substantially horizontal plane, and means for holding the rear ends of said elements spaced apart.

2. An attachment of the class described including rearwardly converging scraping elements adapted to flex in a vertical plane but incapable of flexing in a horizontal plane, and an arched connection between the rear ends of said elements and holding them constantly spaced apart.

3. An attachment of the class described consisting of rearwardly converging scraping elements having a plurality of longitudinally extending soil engaging edges, these elements being adapted to flex vertically but being incapable of flexing horizontally, and a connection between the rear ends of said elements for holding them spaced apart.

4. An attachment of the class described consisting of rearwardly converging scraping elements having a plurality of longitudinally extending soil engaging edges, these elements being adapted to flex vertically but being incapable of flexing horizontally, and a rigid arched connection above and secured to the rear end portions of said elements.

In testimony that I claim the foregoing as my own, I have hereto affixed my signature in the presence of two witnesses.

JACOB E. ERB.

Witnesses:
E. A. ROBBINS,
T. N. ENGDAHL.

---

Copies of this patent may be obtained for five cents each, by addressing the "Commissioner of Patents, Washington, D. C."